United States Patent
Choi (10) Patent No.: US 10,333,893 B2
(45) Date of Patent: Jun. 25, 2019

(54) APN ACCESS METHOD AND PROGRAM, AND TELEMATICS DEVICE AND COMPUTER-READABLE RECORDING MEDIUM FOR PERFORMING THE SAME

(71) Applicant: Hyundai Motor Company, Seoul (KR)

(72) Inventor: Hyunwoo Choi, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 249 days.

(21) Appl. No.: 14/938,618

(22) Filed: Nov. 11, 2015

(65) Prior Publication Data

US 2017/0019834 A1    Jan. 19, 2017

(30) Foreign Application Priority Data

Jul. 13, 2015   (KR) .................. 10-2015-0098840

(51) Int. Cl.
| | |
|---|---|
| H04L 29/12 | (2006.01) |
| H04W 4/50 | (2018.01) |
| H04W 48/00 | (2009.01) |
| H04L 29/08 | (2006.01) |

(52) U.S. Cl.
CPC ........ H04L 61/3075 (2013.01); H04L 61/302 (2013.01); H04W 4/50 (2018.02); H04W 48/17 (2013.01); H04L 67/12 (2013.01)

(58) Field of Classification Search
CPC .............................. H04W 48/09; H04W 48/08
See application file for complete search history.

(56) References Cited

U.S. PATENT DOCUMENTS

| | | | |
|---|---|---|---|
| 8,180,547 B2 | 5/2012 | Prasad et al. | |
| 8,781,442 B1* | 7/2014 | Link, II | G08G 1/205 455/411 |
| 2009/0286524 A1 | 11/2009 | Guedalia et al. | |
| 2011/0249618 A1 | 10/2011 | Shaw et al. | |
| 2015/0382286 A1* | 12/2015 | Daoud | H04W 48/16 455/434 |
| 2016/0309538 A1* | 10/2016 | Chen | H04W 8/02 |

FOREIGN PATENT DOCUMENTS

| | | |
|---|---|---|
| EP | 2549783 A1 | 1/2013 |
| KR | 10-2004-0048529 A | 6/2004 |
| KR | 10-2013-0058521 A | 6/2013 |
| KR | 10-2013-0132208 A | 12/2013 |

OTHER PUBLICATIONS

European Search Report for European Application No. 15198755.9, dated Jul. 4, 2016, 7 pages.

* cited by examiner

*Primary Examiner* — Sulaiman Nooristany
(74) *Attorney, Agent, or Firm* — Mintz Levin Cohn Ferris Glovsky and Popeo, P.C.; Peter F. Corless (57) ABSTRACT

Disclosed herein is an access point name (APN) access method including: (a) checking whether an APN server is accessible via a wireless network connected to a telematics device that is powered on when an amount of time during which an APN change alarm message can be received has elapsed; (b) checking whether an APN update is necessary using an administration APN pre-stored in the telematics device when the APN server is not accessed, and acquiring APN update data from the APN server when the APN server is accessed; and (c) transmitting and receiving data between the telematics device and a data server using the acquired APN update data.

10 Claims, 4 Drawing Sheets

APN ACCESS METHOD AND PROGRAM, AND TELEMATICS DEVICE AND COMPUTER-READABLE RECORDING MEDIUM FOR PERFORMING THE SAME

CROSS-REFERENCE TO RELATED APPLICATION

This application claims the benefit of and priority to Korean Patent Application No. 10-2015-0098840, filed on Jul. 13, 2015, which is hereby incorporated by reference in its entirety as if fully set forth herein.

BACKGROUND OF THE DISCLOSURE

Technical Field

The present disclosure relates generally to access point name (APN) accessing technology, and more particularly, to an APN access method and program for improving APN accessibility of a vehicle, and a telematics device and computer-readable recording medium for performing the same.

Discussion of the Related Art

Over-the-air device management (OTADM) technology for setting or updating a communication setting value under control of a communication network provider (e.g., a base station) applies to mobile terminals. A representative example of OTADM includes an access point name (APN).

APN refers to a string necessary to set or update the name of a mobile terminal that may be connected to a wireless network via the APN. In order to change the APN set in the mobile terminal, the mobile terminal receives a specific message (e.g., an APN change alarm message) from the base station. The specific message refers to a message periodically transmitted to the mobile terminal during a specific time (e.g., 72 hours in North America Verizon) set in the wireless network.

When the mobile terminal normally receives the specific message, the wireless network is accessed to normally perform data transmission and reception. However, unlike the above-described mobile terminal, even when a telematics device mounted in a vehicle accesses the same wireless network as the mobile terminal, the APN may not be normally updated in a wireless environment in which the specific time has elapsed due to a weak electric field, a shadow area, or a power off (e.g., power off due to long-term parking).

SUMMARY OF THE DISCLOSURE

Accordingly, the present disclosure is directed to an APN access method and program for improving APN accessibility of a vehicle, and a telematics device and a computer-readable recording medium for performing the same that substantially obviate one or more problems due to limitations and disadvantages of the related art. An object of the present disclosure is to provide an APN access method and program for rapidly updating an APN even when power is turned off for a long period of time, and a telematics device and a computer-readable recording medium for performing the same.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, an access point name (APN) access method includes: (a) checking whether an APN server is accessible via a wireless network connected to a telematics device that is powered on when an amount of time during which an APN change alarm message can be received has elapsed; (b) checking whether an APN update is necessary using an administration APN pre-stored in the telematics device when the APN server is not accessed, and acquiring APN update data from the APN server when the APN server is accessed; and (c) transmitting and receiving data between the telematics device and a data server using the acquired APN update data.

Step (a) may further include (a-1) attempting to access the wireless network and acquiring a service state from the wireless network.

Step (a) may further include (a-2) checking whether the APN server is accessible using a pre-stored old APN when the service state is normal.

Step (a) may further include (a-3) determining whether an access reject message is received from the APN server, which has checked the old APN, and (a-4) determining that the APN server cannot be accessed when the access reject message is received.

Step (b) further may include (b-1) transmitting the administration APN to the APN server when the access reject message is received, and (b-2) receiving the APN update data from the APN server upon determining that the administration APN is equivalent to the pre-stored administration APN.

Furthermore, according to embodiments of the present disclosure, there is provided a non-transitory computer-readable medium having a program for performing the APN access method described above recorded thereon.

Furthermore, according to embodiments of the present disclosure, a telematics device includes: a server access checking unit checking whether an access point name (APN) server is accessible via a connected wireless network when the telematics device is powered on in a state in which an amount of time during which an APN change alarm message can be received has elapsed; an APN update unit checking whether an APN update is necessary using an administration APN pre-stored in the telematics device when the APN server is not accessed, and acquiring APN update data from the APN server when the APN server is accessed; and a data transmission unit configured transmitting and receiving data to and from a data server using the acquired APN update data.

The server access checking unit may include a wireless network access unit attempting to access the wireless network and acquiring a service state from the wireless network.

The server access checking unit may include an old APN access unit configured to check whether the APN server is accessible using a pre-stored old APN when the service state is normal.

The old APN access unit may determine whether an access reject message is received from the APN server, which has checked the old APN; and determine that the APN server cannot be accessed when the access reject message is received.

The APN update unit may transmit the administration APN to the APN server when the access reject message is received and receive the APN update data from the APN server upon determining that the administration APN is equivalent to the pre-stored administration APN.

Furthermore, according to embodiments of the present disclosure, a telematics device includes: a memory configured to store at least one program, and a processor configured to execute the at least one program.

The at least one program includes instructions for: checking whether an APN server is accessible via a connected wireless network when the telematics device is powered on in a state in which an amount of time during which an APN change alarm message can be received has elapsed; checking whether an APN update is necessary using a pre-stored administration APN when the APN server is not accessed, and acquiring APN update data from the APN server when the APN server is accessed; and transmitting and receiving data to and from a data server using the acquired APN update data.

The at least one program may include further instructions for attempting to access the wireless network and acquiring a service state from the wireless network.

The at least one program may include further instructions for checking whether the APN server is accessible using a pre-stored old APN when the service state is normal.

The at least one program may include further instructions for determining whether an access reject message is received from the APN server, which has checked the old APN and determining that the APN server cannot be accessed when the access reject message is received.

The at least one program may include further instructions for transmitting the administration APN to the APN server when the access reject message is received, and receiving the APN update data from the APN server upon determining that the administration APN is equivalent to the pre-stored administration APN.

The aspects of the present disclosure are only a part of the embodiments of the present disclosure, and various embodiments based on technical features of the present disclosure may be devised and understood by one of ordinary skill in the art based on the detailed description of the present disclosure.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

Reference will now be made in detail to the embodiments of the present disclosure, examples of which are illustrated in the accompanying drawings. Wherever possible, the same reference numbers will be used throughout the drawings to refer to the same or like parts, and a repeated description thereof will be omitted.

Technical terms used in this specification are used merely to illustrate specific embodiments, and it should be understood that they are not intended to limit the present disclosure. For example, a singular representation used in the description of embodiments and claims may include a plural representation unless context clearly indicates otherwise.

In addition, "and/or" used in this specification should be understood as any or all possible combinations of one or more enumerated items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Further, a telematics device described in this specification refers to a device for providing a driver with not only a traffic service and a navigation service but also with an ACN service, an SOS service, a music steaming service and a call connection service by applying mobile communication technology and position tracking technology (global positioning system (GPS)) to a vehicle.

Such a telematics device provides a mechanism for recognizing the service state of a wireless network and rapidly upgrading APN update data using an administration APN, even when APN update data is not upgraded in a wireless environment in which a specific time has elapsed due to weak electric field, shadow area and power off (e.g., power off due to long-term parking).

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Hereinafter, the mechanism for rapidly upgrading the APN update data in a power off environment will be described in detail.

<Example of APN Access Method>

Figure 1:
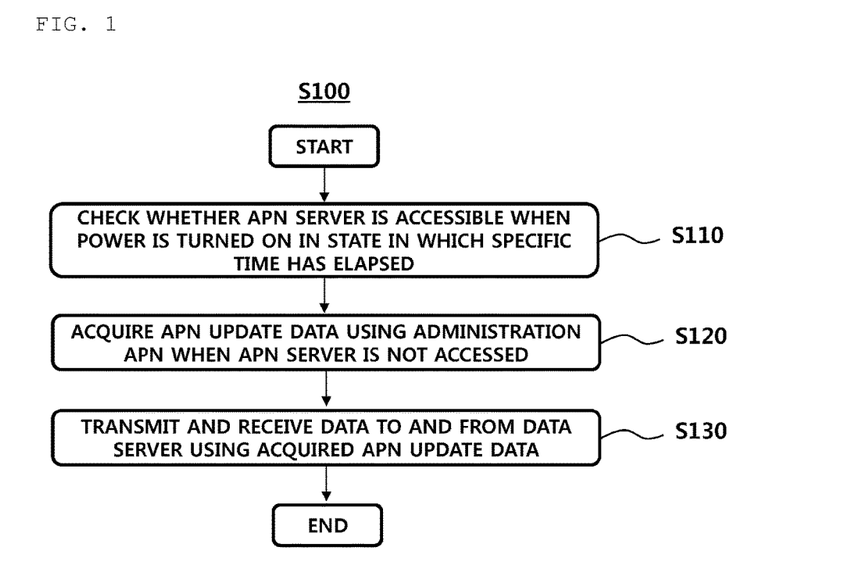
FIG. 1 is a flowchart illustrating an APN access method according to embodiments of the present disclosure.
Figure 2:
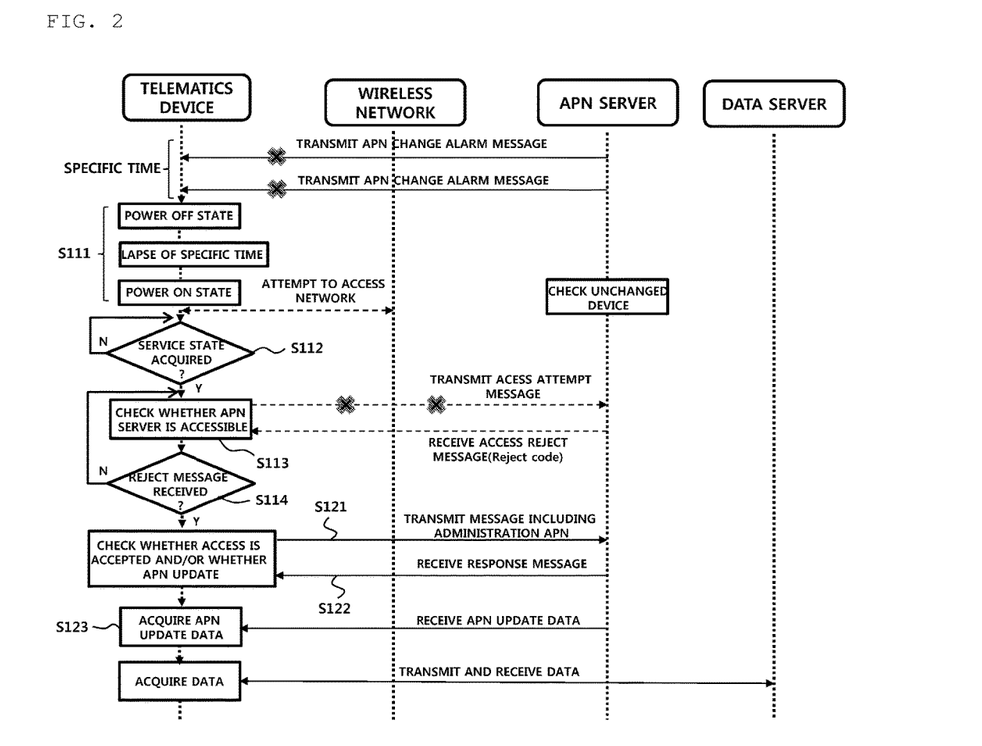
FIG. 2 is a flowchart illustrating the steps of the APN access method of FIG. 1 in detail.

FIG. 1 is a flowchart illustrating an APN access method according to embodiments of the present disclosure, and FIG. 2 is a flowchart illustrating the steps of the APN access method of FIG. 1 in detail.

As shown, the APN access method 100 includes steps S110 to S130.

First, in step S110, whether the telematics device is powered on in a state in which a predetermined specific amount of time has elapsed is checked (S111). The specific amount of time means a period of time during which an APN change alarm message (which is equivalent to APN update data) is not received from an APN server. For example, the specific amount of time may be 1 to 72 hours.

Even upon determining that the telematics device is powered on, since the specific time has elapsed, the telematics device cannot immediately receive the APN change alarm message. Accordingly, the telematics device should access a wireless network and the APN server again.

In step S110, when the telematics device is powered on, the telematics device attempts to access the wireless network, determines whether the service state of the wireless network is normal, and acquires the service state related to access to the wireless network when the service network of the wireless network is normal (S112).

When the service state is normally acquired, the telematics device may access the wireless network. The telematics device checks whether the APN server is accessible via the accessed wireless network. The telematics device may check whether the APN server is accessible using a pre-stored old APN.

The pre-stored old APN is an APN setting value lastly updated in the telematics device and indicates information necessary to attempt to access the APN server and to check whether the APN server is accessible (S113).

When the wireless network is accessed, the old APN is automatically transmitted to the APN server via the accessed wireless network. However, the APN server may not immediately accept access even when an access request message including the old APN is received.

In step S110, in order to check whether access is accepted, whether an access reject message is received from the APN server, which has checked the old APN, may be determined (S114). The access reject message may be a message which is generated when a response is not received or the old APN message is received after the APN change alarm message is periodically transmitted to the telematics device.

In step S110, when the access reject message is received from the APN server, it may be determined that the APN server cannot be accessed and, when a response message including the access reject message is not received, it is determined that the wireless network or the APN server cannot be accessed.

In step S120, when the APN server cannot be accessed, for example, when the access reject message is received, whether the APN server (e.g., an OTADM server) accepts access and/or whether APN update is necessary may be determined using the administration APN pre-stored in the telematics device. For example, when the access reject message is received, in step S120, a message including the administration APN is transmitted to the APN server (S121). Whether the APN server 200 accepts access or whether APN update data is present is determined only when a response message is received from the APN server (S122).

When the response message is received, the telematics device may receive the APN update data from the APN server, which has accepted access, via the wireless network to acquire the APN update data (S123).

Even when the telematics device is powered off for a long period of time, it is possible to rapidly upgrade the APN update data by checking whether the APN server accepts access and/or whether APN update is necessary.

Lastly, in step S130, data is transmitted and received to and from a data server using the APN update data acquired in the telematics device. Here, the transmitted and received data refers to data related to a telematics service.

The above-described APN access method may be implemented in the form of program instructions implemented via various computer components and may be recorded on a computer-readable recording medium. The recording medium may be a medium accessible by a processor and may include at least one of a volatile or non-volatile medium, a detachable or non-detachable medium, a communication medium and a storage medium. The communication medium may include at least one of a computer-readable instruction, a data structure and a program module. Further, the communication medium may include an information delivery medium in an arbitrary form known in this technical field. The storage medium may include a random access memory (RAM), a flash memory, a read only memory (ROM), an erasable programming read only memory (EPROM), an electrically erasable programmable read-only memory (EEPROM), a hard disk, a detachable disk, a compact disc, a read only memory (CD-ROM) or any storage medium known in this technical field.

<Example of Telematics Device>

Figure 3:
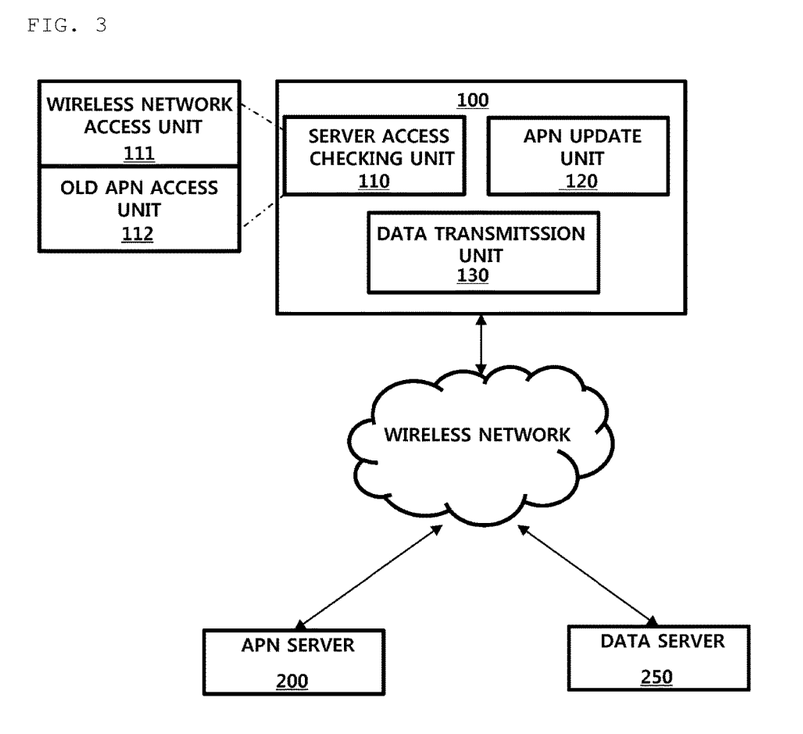
FIG. 3 is a block diagram showing an example of a telematics device according to embodiments of the present disclosure.

FIG. 3 is a block diagram showing an example of a telematics device according to embodiments of the present disclosure.

As shown in FIG. 3, the telematics device 100 according to one embodiment includes a server access checking unit 110, an APN update unit 120 and a data transmission unit 130.

First, the server access checking unit 110 checks whether the telematics device is powered on in a state in which a predetermined specific amount of time has elapsed. The specific amount of time means a period of time during which an APN change alarm message (which is equivalent to APN update data) is not received from an APN server. For example, the specific amount of time may be 1 to 72 hours.

Even upon determining that the telematics device is powered on, since the specific time has elapsed, the server access checking unit 110 cannot immediately receive the APN change alarm message. Accordingly, the telematics device 100 should access the wireless network and the APN server 200 again.

The server access checking unit 110 may include a wireless network access unit 111 and an old APN access unit 112. When the telematics device is powered on, the wireless network access unit 111 may attempt to access the wireless network and determine whether the service state of the wireless network is normal. When the service state is normally acquired, the wireless network access unit 111 may access the wireless network.

The old APN access unit 112 checks whether the APN server 200 is accessible via the accessed wireless network. The old APN access unit 112 may check whether the APN server 200 is accessible using the pre-stored old APN. The pre-stored old APN is an APN setting value lastly updated in the telematics device 100 and indicates information necessary to attempt to access the APN server 200 and to check whether the APN server is accessible.

When the wireless network is accessed, the old APN is automatically transmitted to the APN server 200 via the accessed wireless network. However, the APN server 200 may not immediately accept access even when an access request message including the old APN is received.

Therefore, in order to check whether access is accepted, whether an access reject message is received from the APN server 200, which has checked the old APN, may be determined.

The access reject message may be a message which is generated when a response is not received or the old APN message is received after the APN change alarm message is periodically transmitted to the telematics device 100.

The old APN access unit 112 determines that the APN server 200 cannot be accessed when the access reject message is received from the APN server 200 and determines that the wireless network or the APN server 200 cannot be accessed when a response message including the access reject message is not received.

For example, when the APN server 200 cannot be accessed, and when the access reject message is received, the APN update unit 120 determines whether the APN server 200 accepts access and/or whether APN update is necessary using the administration APN pre-stored in the telematics device 100. As another example, when the access reject message is received, the APN update unit 120 transmits a message including the administration APN to the APN server 200. Whether the APN server 200 accepts access or whether APN update data is present may be determined only when a response message is received from the APN server 200.

When the response message is received, the APN update unit 120 may receive the APN update data from the APN server 200, which has accepted access, via the wireless network to acquire the APN update data. Therefore, even when the telematics device is powered off for a long period of time, it is possible to rapidly upgrade the APN update data by checking whether the APN server 200 accepts access and/or whether APN update is necessary.

Lastly, the data transmission unit 130 may transmit and receive data to and from a data server 250 using the APN update data acquired in the APN update unit 120. The transmitted and received data refers to data related to a telematics service.

<Another Example of Telematics Device>

Figure 4:
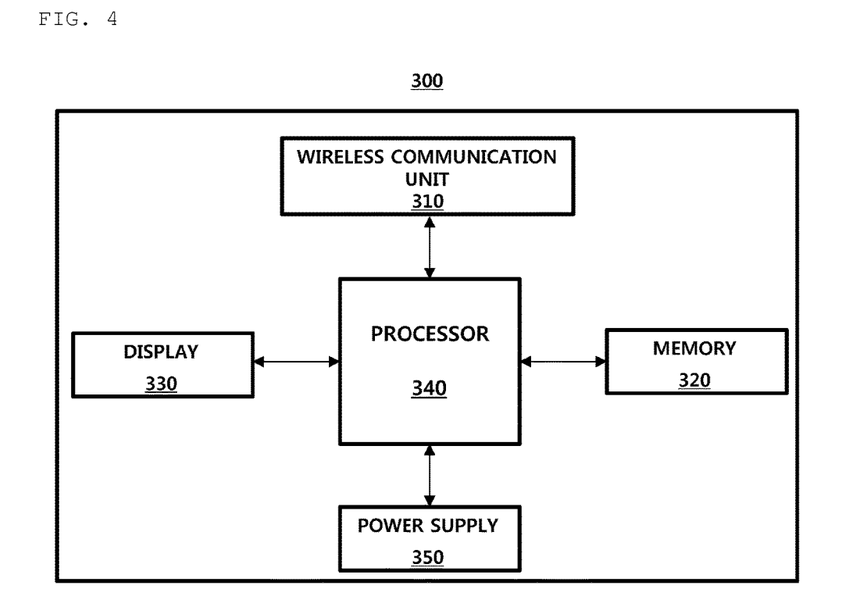
FIG. 4 is a block diagram showing another example of the telematics device of FIG. 3.

FIG. 4 is a block diagram showing another example of the telematics device of FIG. 3.

As shown in FIG. 4, the telematics device 300 according to embodiments of the present disclosure processes a mechanism for recognizing the service state of a wireless network and rapidly upgrading APN update data using an administration APN, even when APN update data is not upgraded in a wireless environment in which a specific amount of time has elapsed due to weak electric field, shadow area and power off (e.g., power off due to long-term parking).

In order to process the above-described mechanism, the telematics device may include a wireless communication unit 310, a memory 320 including at least one computer-readable recording medium, a display 330, a processor 340 for processing at least one core and a power supply 350.

The wireless communication unit 310 has at least one communication interface structure of a serial network, a parallel network and a wireless interface. The communication interface provides an access and/or communication link between wireless networks.

The memory 320 may store information, software programs, instruction codes, etc. processed by the processor 340. The memory 320 may be, for example, high-speed random access memory such as dynamic random access memory (DRAM), synchronous DRAM (SDRAM), double data rate (i) SDRAM, DDR2 SDRAM, Rambus DRAM (RDRAM), SRAM, DDR RAM, or a random access solid state memory. Further, the memory 320 may be at least one of a magnetic disk, an optical disc, a flash memory, and a non-volatile memory, such as a non-volatile solid state memory. The memory 320 may be implemented as part of the processor 340.

The display 330 displays information input by a user or information provided to a user and various graphical user interfaces (GUIs) of the telematics device. The GUI may be composed of figures, text, icons, video and combinations thereof. The display 330 may include a display panel 331. The display panel 331 may be selectively composed of a liquid crystal display (LCD) and an organic light-emitting diode (OLED). The display panel 331 may include two independent parts for respectively performing an output function and an input function.

The processor 340 is the control center of the telematics device and is connected to each unit via various interfaces and circuits. The processor 340 executes a software program, information or instruction codes stored in the memory 320 and calls information stored in the memory 320 to perform the functions of the telematics device and process data. The processor 340 checks whether the telematics device is powered on in a state in which a predetermined specific amount of time has elapsed. For example, the specific amount of time may be 1 to 72 hours.

Even upon determining that the telematics device is powered on, since the specific time has elapsed, the processor 340 cannot immediately receive an APN change alarm message. Accordingly, the telematics device should access the wireless network and the APN server again.

When the telematics device is powered on, the processor 340 may attempt to access a wireless network and determine whether the service state of the wireless network is normal.

When the service state is normally acquired, the wireless communication unit 310 may access the wireless network. The processor 340 checks whether the APN server is accessible via the accessed wireless network. The processor 340 may check whether the APN server is accessible using the pre-stored old APN.

The pre-stored old APN is an APN setting value lastly updated in the telematics device and indicates information necessary to attempt to access the APN server and to check whether APN server is accessible. When the wireless network is accessed, the old APN is automatically transmitted to the APN server via the accessed wireless network. However, the APN server may not immediately accept access even when an access request message including the old APN is received. Therefore, in order to check whether access is accepted, the processor 340 may determine whether an access reject message is received from the APN server.

The access reject message may be a message which is generated when a response is not received or the old APN message is received after the APN change alarm message is periodically transmitted to the telematics device 100.

The processor 340 determines that the APN server cannot be accessed when the access reject message is received from the APN server and determines that the wireless network or the APN server cannot be accessed when a response message including the access reject message is not received.

For example, when the APN server cannot be accessed, when the access reject message is received, the processor 340 may determine whether the APN server 200 accepts access and/or whether APN update is necessary using the administration APN pre-stored in the telematics device.

As another example, when the access reject message is received, the processor 340 may transmit a message including the administration APN to the APN server. Whether the APN server accepts access or whether APN update data is present may be determined only when a response message is received from the APN server.

When the response message is received, the processor 340 may receive the APN update data from the APN server, which has accepted access, via the wireless network to acquire the APN update data. Therefore, even when the telematics device is powered off for a long period of time, it is possible to rapidly upgrade the APN update data by checking whether the APN server accepts access and/or whether APN update is necessary.

The processor 340 transmits and receives data to and from a data server using the acquired APN update data. Here, the transmitted and received data means data related to a telematics service. The processor 340 for performing the APN access method described with reference to FIGS. 1 and 2 may include one or a plurality of cores. For example, an operation processor for performing the APN access method and a modem processor may be integrated. The operation processor mainly executes an operating system (OS) and a user interface and performs a safe driving method and the modem processor mainly performs wireless communication. However, the modem processor may not be included in the processor 340.

Lastly, the power supply 350 supplies power to each unit and is logically connected to the processor 340 via a power management system to perform charging, discharging and power management via the power management system. The power supply 350 may include at least one of a DC or AC power supply, a recharging system, a power failure detection circuit, a power converter or inverter, a power state indicator, etc.

As described above, in the embodiments of the present disclosure, although APN update is not immediately performed due to long-term power off, it is possible to rapidly perform access to a server using an administration APN and APN update. According to the embodiments of the present disclosure, even when power is turned off for a long period of time, it is possible to perform data upgrade via rapid APN update.

The above detailed description is not to be construed as limiting the present disclosure in all aspects and be considered by way of example. The scope of the present disclosure should be determined by reasonable interpretation of the accompanying claims and all equivalent modifications made without departing from the present disclosure should be included in the following claims.

What is claimed is:

1. An access point name (APN) access method comprising:
   (a) checking a service state of a wireless network connected to a telematics device when the telematics device is powered on after a specific time has elapsed during a power-off state;
   (b) checking whether an APN server is accessible using a pre-stored old APN when the service state of the wireless network is normal;
   (c) checking whether an APN update is necessary using an administration APN pre-stored in the telematics device when the APN server is not accessible using the old APN;
   (d) receiving APN update data from the APN server using the administration APN when the APN update is necessary;
   (e) updating the old APN with a new APN based on the received APN update data; and
   (f) transmitting and receiving data between the telematics device and a data server using the new APN, wherein step (c) comprises:
   transmitting a message including the administration APN to the APN server; and
   when the APN server is accessible using the old APN, acquiring the APN update data from the APN server in response to the telematics device receiving a response message from the APN server indicating that access to the APN server is accepted, the APN update data including a new APN which is different from the old APN.

2. The APN access method according to claim 1, wherein step (b) further comprises:

(b-1) determining whether an access reject message is received from the APN server, which has checked the old APN; and
   (b-2) determining that the APN server cannot be accessed when the access reject message is received.

3. The APN access method according to claim 2, wherein step (d) further comprises:
   (d-1) transmitting the administration APN to the APN server when the access reject message is received; and
   (d-2) receiving the APN update data from the APN server upon determining that the administration APN is equivalent to the pre-stored administration APN.

4. A non-transitory computer-readable medium having a program for performing the APN access method according to claim 1 recorded thereon.

5. A telematics device comprising:
   a wireless network access unit checking a service state of a wireless network connected to the telematics device when the telematics device is powered on after a specific time has elapsed during a power-off state;
   a server access checking unit checking whether an access point name (APN) server is accessible using a pre-stored old APN when the service state of the wireless network is normal;
   an APN update unit checking whether an APN update is necessary using an administration APN pre-stored in the telematics device when the APN server is not accessible using the old APN, receiving APN update data from the APN server using the administration APN when the APN update is necessary, and updating the old APN with a new APN based on the received APN update data; and
   a data transmission unit transmitting and receiving data to and from a data server using the new APN,
   wherein the APN update unit transmits a message including the administration APN to the APN server, and when the APN server is accessible using the old APN, acquires the APN update data from the APN server in response to the telematics device receiving a response message from the APN server indicating that access to the APN server is accepted, the APN update data including a new APN which is different from the old APN.

6. The telematics device according to claim 5, wherein the server access checking unit includes an old APN access unit which:
   determines whether an access reject message is received from the APN server, which has checked the old APN; and
   determines that the APN server cannot be accessed when the access reject message is received.

7. The telematics device according to claim 6, wherein the APN update unit:
   transmits the administration APN to the APN server when the access reject message is received; and
   receives the APN update data from the APN server upon determining that the administration APN is equivalent to the pre-stored administration APN.

8. A telematics device comprising:
   a memory configured to store at least one program; and
   a processor configured to execute the at least one program,
   the at least one program including instructions for:
   checking a service state of a wireless network connected to the telematics device when the telematics device is powered on after a specific time has elapsed during a power-off state;

checking whether an APN server is accessible using a pre-stored old APN when the service state of the wireless network is normal;

checking whether an APN update is necessary using a pre-stored administration APN when the APN server is not accessible using the old APN;

receiving APN update data from the APN server using the administration APN when the APN update is necessary;

updating the old APN with a new APN based on the received APN update data; and transmitting and receiving data to and from a data server using the new APN, wherein the checking of whether the APN update is necessary comprises:

transmitting a message including the administration APN to the APN server; and when the APN server is accessible using the old APN, acquiring the APN update data from the APN server in response to the telematics device receiving a response message from the APN server indicating that access to the APN server is accepted, the APN update data including a new APN which is different from the old APN.

9. The telematics device according to claim 8, wherein the at least one program includes further instructions for:

determining whether an access reject message is received from the APN server, which has checked the old APN; and determining that the APN server cannot be accessed when the access reject message is received.

10. The telematics device according to claim 9, wherein the at least one program includes further instructions for:

transmitting the administration APN to the APN server when the access reject message is received; and receiving the APN update data from the APN server upon determining that the administration APN is equivalent to the pre-stored administration APN.

* * * * *